United States Patent [19]

Poole

[11] 4,212,084

[45] Jul. 8, 1980

[54] BEAM-FORMER FOR FFT-BASED SIGNAL PROCESSOR

[75] Inventor: Lynn A. Poole, State College, Pa.

[73] Assignee: The United States of America as represented by the Secretary of the Navy, Washington, D.C.

[21] Appl. No.: 962,538

[22] Filed: Nov. 20, 1978

[51] Int. Cl.[2] .............................................. G01S 3/80

[52] U.S. Cl. .................................... 367/118; 367/123; 343/100 SA; 343/5 FT

[58] Field of Search ...... 340/6 R; 343/5 FT, 100 SA; 367/118 (U.S. only), 122 (U.S. only), 123 (U.S. only)

[56] References Cited

U.S. PATENT DOCUMENTS

| | | | |
|---|---|---|---|
| 4,107,685 | 8/1978 | Martin et al. | 343/100 SA |
| 4,112,430 | 9/1978 | Ladstatter | 340/6 R X |

*Primary Examiner*—Richard A. Farley
*Attorney, Agent, or Firm*—R. S. Sciascia; Sol Sheinbein

[57] ABSTRACT

A beam-former for sampling and digitizing a sonar signal preparatory to Fast Fourier Transformer (FFT) processing comprising an array of ceramic sensors forming a series of rows and columns, a sampling transformer for each row and each column for sampling the weighted sum of the signals from the sensors in each row or column, a log compressor for each sampling transformer for compressing the amplitude of the sampled signal, an analog-to-digital (A/D) converter circuit following each log compressor for sampling and digitizing the compressed signals under the control of a counting circuit so that the log compressor outputs are sampled at prescribed times in relation to each other so as to impart a time or phase shift to the digitized outputs to effect a beam tilting, a decompression circuit for decompressing the time shifted signals, an accumulator for adding the samples from each row and column, and a shifting circuit for shifting the accumulated signal up or down to make it compatible with the FFT circuit.

24 Claims, 2 Drawing Figures

BEAM-FORMER FOR FFT-BASED SIGNAL PROCESSOR

FIELD OF THE INVENTION

This invention relates generally to signal processing in radiated wave detection systems, and more specifically to tilted-beam sonar signal processing systems using Fast Fourier Transformers.

BACKGROUND OF THE INVENTION

In sonar-type systems an array of pressure sensors is utilized to form an acoustic hydrophone. These sensors elements are coupled to the water through the hydrophone face such that the pressure variations at the face of the hydrophone generate electrical signals in the sensor elements. The electrical outputs from each element of the array can be processed separately and then combined to form a narrow directional pattern of maximum sensitivity. A common direction pattern (the boresight beam) has a direction of maximum sensitivity orthogonal to the plane of the array. This orthogonal beam is generated by weighting the output from each element of the array and then summing these weighted signals.

It is frequently desirable in sonar search and tracking modes to alter the direction of maximum sensitivity such that it is no longer orthogonal to the plane of the array, i.e., a tilted beam. The generation of a tilted beam can be accomplished by time shifting the weighted signal outputs from the array before summing these signals. This systematic introduction of a time shift in the outputs of the array elements corresponds to the phase shift that is necessary in order to tilt the beam from its normal boresight axis to a position orthogonal to a vertical plane of the array.

The conventional method of introducing a time shift to the individual elements or groups of elements in an array to obtain a tilted beam is to design a network of high performance time delay circuits for feeding the element output signals to the summer. However, the hardware requirements due to these high performance time delay circuits are significant. If it is desirable to generate and tilt several beams simultaneously, the volume of hardware becomes prohibitive.

Another major problem in this system, and in sonar systems generally, resides in eliciting an optimum signal-to-noise ratio so as to obtain the maximum detection range possible for given hardware with a minimum false alarm rate. One method of providing a high signal-to-noise ratio is to utilize a comb filter comprising a large number of narrowband filters. Each narrowband filter will then compare a target return signal occurring in that frequency band only to the noise in that narrowband frequencies. This design provides a substantial improvement in the signal-to-noise ratio because the target return signal is no longer received against a background of the noise over the entire band of interest. In designing comb filters, it is well known that in order to increase the gain of the filter, the bandwidth for each individual filter must be decreased. A decrease in filter bandwidth, in turn, requires a proportionate increase in the number of filters needed in order for the overall comb to cover the same bandwidth. It can be seen that hardware requirements for such a filter become prohibitive as the filter gain requirements increase.

As an alternative, it has been suggested to use Fourier Transform processing in order to obtain the required large number of narrowband filters or frequency bins for high gain processing. In this regard, Fast Fourier Transforms (FFT) may be used to compute the Fourier Transforms in real-time on the computer. The use of FFT processing can be thought of as providing an order of magnitude over comb filters.

An FFT signal processor operates by sampling amplitude words at prescribed time increments. The interval between input sample points is determined by the sampling theorem which states that for a band-limited signal the samples must be taken on the order of twice the bandwidth. Generally, it is the practice to choose the desired number of frequency bins and then use two samples per bin. Thus, the sampling rate is usually a function of both the bins and the overall system bandwidth, and in most sonar-type signal processing systems is considerably lower than the systems' center frequency.

Two major problems occur when FFT processing is used. First, FFT processing, in practical terms, requires that preliminary circuitry convert the incoming analog signals to digital signals. However, analog-to-digital (A/D) converters are usually capable of handling words with only a limited number of bits. This bit limitation, in turn, severely limits the dynamic range (ratio of the smallest signal to the largest signal) of the input signals applied thereto. Thus, input normalizing or automatic gain control circuitry (AGC) must be used to limit the input signal to a value consistent with the dynamic range of the A/D converter. The operation of the system when the input signal is varying a wide dynamic range will be further limited by the response time of this input normalizing circuitry. The slow response time of this circuitry is due primarily to the requirement that AGC circuitry be less than the system bandwidth in order to prevent the gain from changing faster than the signal and interfering with the information flow. Additionally, the transients generated by the gain changes tend to distort the signal output of the A/D converter. It is possible to increase the dynamic range of the system by increasing the resolution of the A/D converter. However, the conversion time for the A/D converter would also increase substantially due to the higher accuracies required in the A/D converter analog comparisons due to the longer delays needed for the transients in the system to fall below the reduced uncertainty levels.

The second major problem with using FFT processing resides in the fact that the speed of an FFT circuit is usually determined by the multiplication time of the FFT's digital hardware. The FFT system complexity will increase and the system's maximum bandwidth will decrease, when the input word length is increased. Thus, an FFT system is generally a limited dynamic range processor.

The dynamic range limitations of the A/D converter and the FFT circuit are significant because radiated energy detection systems must, in general, have a wide dynamic range so that both very large signals from close targets and very low signals from far targets can be accurately detected.

OBJECTS OF THE INVENTION

An object of the present invention is to substantially reduce the hardware required to generate a tilted beam.

A further object of the present invention is to eliminate the high performance time delay circuits used in analog systems to generate a tilted beam.

A still further object of the present invention is to increase the dynamic range of beam-forming systems.

A further object of the present invention is to make a beam-forming processor which is compatible with a Fast Fourier Transform processor.

A further object of the present invention is to reduce the hardware requirements when using Fast Fourier Transform processing to obtain a tilted beam by eliminating the need for automatic-gain-control circuitry.

A still further object of the present invention is to substantially reduce the hardware necessary to generate multiple tilted beams.

SUMMARY OF THE INVENTION

Briefly, the present invention comprises a beam-forming signal processor for use with a Fast Fourier Transform circuit including an array of signal sensors, a plurality of sampling circuits for sampling and weighting subarrays of signal sensors in the array, a compressor circuit including a compressor for each sampling circuit for compressing the outputs of the respective sampler circuits, an analog-to-digital (A/D Converter) circuit including a A/D converter for each compressor for sampling and digitizing the output signals from the respective compressors under the control of a counter circuit so that the compressor outputs are sampled at prescribed times in relation to each other to thereby impart a time or phase shift to the digitized outputs so the direction of maximum sensitivity of the beam formed by processing these signals will be tilted, a decompressing circuit for decompressing the digital output from the A/D converter, an accumulating circuit for accumulating one decompressed sample signal from each of the signal samplers, and a circuit for applying this accumulated signal representing one "look" at a tilted beam to the Fast Fourier Transform circuit.

DETAILED DESCRIPTION OF THE PREFERRED EMBODIMENT

Figure 2:
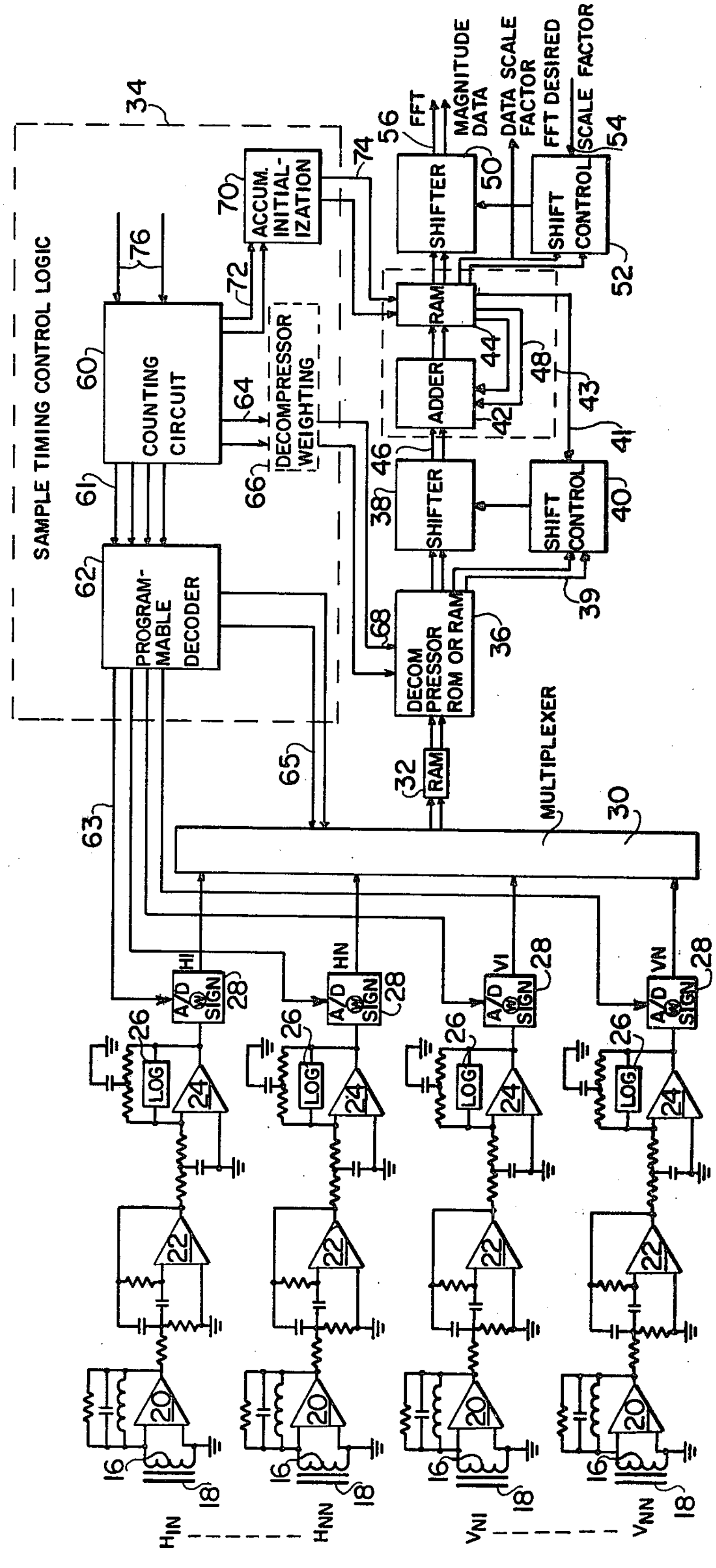
FIG. 2 is a system block diagram of one embodiment of the tilted beam sonar system for an NXN array in accordance with the present invention.

Referring now to the drawings, FIG. 2 presents a block diagram of a tilted beam processing system for providing an interface between a receiver and a Fast Fourier Transform circuit in a radiant energy detection system. This processing system is disclosed in the context of a sonar detection system. However, it should be noted that the principles of this invention are not limited to sonar systems, but are applicable in any detection system where Fast Fourier Transforms are utilized.

Figure 1:
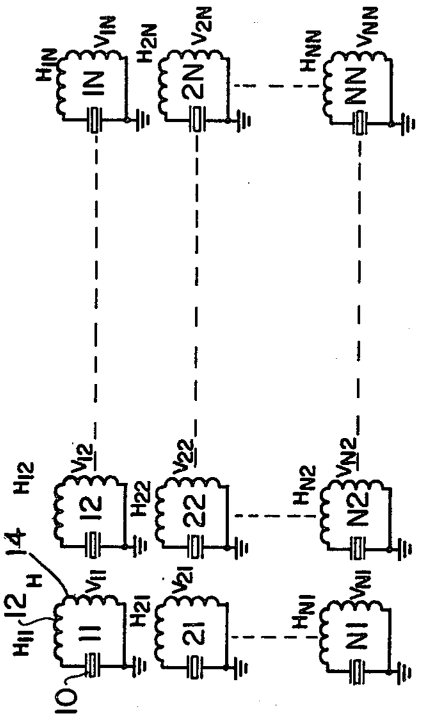
FIG. 1 is a schematic diagram of an NXN ceramic sensor array.

FIG. 1 represents a planar NXN array of pressure sensors for forming an acoustic hydrophone in a sonar receiver. The individual elements 10 of the array may be made from piezoelectric ceramic material and are tuned mechanically to respond to a desired band of frequencies. These ceramic elements are coupled to the water through a hydrophone face such that pressure variations at the face of the hydrophone generate electrical signals therein. These electrical signals are detected by connecting each of the ceramic elements 10 in a closed electrical circuit with a horizontal secondary winding 12 of a horizontal coupling transformer and a vertical winding 14 of a vertical coupling transformer. The voltage generated in the ceramic element 10 causes a current to flow through the windings 12 and 14. This current is coupled from these secondaries to the primary 16 (shown in FIG. 2) of the respective transformers 18. Each ceramic element 10 with its attendant secondary windings 12 and 14 is designated by its position in the array as follows: row, column. For example, element N2 represents the element in row N, column 2. Each of the horizontal secondary windings 12 is designated by the letter H and its respective row and column position. Likewise, each of the vertical secondary windings 14 is designated by the letter V and its respective row and column position.

As noted previously, the output from each element or of elements in the array can be processed separately to generate a narrow directional pattern of maximum sensitivity. By weighting the output from each element or group of elements, the shape of the pattern can be controlled. (Symmetrical center weighting is commonly used in beam-tilt applications.) Likewise, by appropriately time-shifting the outputs from the elements or groups of elements, the direction of maximum beam sensitivity can be tilted off the boresight axis. An FFT circuit is designed to operate on samples of the weighted sum of the time shifted signals from each element or group of elements of the array. Each weighted sum of time-shifted signals constitutes a "look" at a volume of space in one particular sensitivity pattern direction or beam tilt.

Since FFT processing requires only samples of the signal and not a continuous signal input, it is possible to eliminate the high performance time delay circuits required in prior systems for timing shifting. More specifically, by properly controlling the sampling times for each element or group of elements so that an appropriate time or phase shift is imparted to the signal form that element in relation to adjacent array element signals, the sensitivity beam can be tilted at will. The advantages of the elimination of the time delay circuits become especially apparent for systems with a large number of tilted beams or with steerable beam systems. The method of controlling the time of the sampling will be discussed later in relation to the Sample Timing Control Logic 34.

Using the above-noted sampling technique, a coupling transformer 18 with its attendant pre-amplifiers, filters, etc. can be provided for each ceramic element 10 in order to obtain a two-plane beam tilting system. However, the hardware requirement for a two-plane beam tilting system with an NXN array of sensors is $N^2$ preamps, system filters, etc. Additionally, the complexity of the sampling control circuit will increase with $N^2$ and will pose certain hardware limitations. In order to avoid this, the instant system has been implemented so that the beam tilt angle can be set along either the horizontal or vertical array axis. The versatility of a system where the beam can be tilted along either axis and the provision for beams along both axis simultaneously with the tilt angle under the control of software will provide the capability of solving most detection problems. This modification can be realized using 2N sets of hardware. The processing modification can be understood by visualizing the system as a set of subarrays. The simplest case would be the use of orthogonal line arrays of N elements back, within the NXN array. The time shift for a 1XN array with one possible axis of tilt would be applied in a linear manner as a function of the element number. Since there is a line array for each of the N rows and for each of the N columns, there will be 2N line arrays. The sensitivity pattern for each line array is formed by weighting and then summing the outputs for each of the elements in the line array. The weighting of each of the elements in the line array can be accomplished by setting the turns ratio of the secondary windings of the elements in the line array in relation to each other so that the sensed outputs from the different elements in the line array are in the proper proportion to each other. The windings 16 comprise the primaries for the coupling transformers and are coupled to the various secondary windings 12 and 14. The transformer primaries 16 are designated with the notation $H_{1N}$ - $H_{NN}$ and $V_{N1}$ - $V_{NN}$ to represent the outputs from the 2N orthogonal line arrays. For example, the transformer designated $H_{1N}$ is coupled to the secondary windings $H_{11}$ through $H_{1N}$ and provides a summation of signals therethrough. The transformers 18 are operated with a very low impedance on their primaries in order to enhance their current summing characteristics. The different line arrays may be weighted with respect to each other by properly adjusting the turns ratio in their respective primaries so that the outputs from the primaries are in the correct proportion to each other.

The first stage of circuitry in FIG. 2 after the transformer primary 16 is a bandpass filter 20. This bandpass filter functions to provide a very low impedance termination for the line array transformers 18 and may be formed by an operational amplifier with appropriate biasing circuitry. The second stage of the circuitry comprises a second bandpass filter 22 for providing additional bandpass filtering and for providing a high current drive capability for the signal input to the 3rd stage. This second bandpass filter may also be formed from an operational amplifier with appropriate biasing circuitry.

As noted previously, a major problem encounted when using FFT processing is the low dynamic range of the A/D converter. This problem is generally overcome by using a large number of AGC circuits with their attendant response limitations.

The present system eliminates the need for these AGC circuits by compressing the outputs from the transformer 18 before application to the A/D converters. A variety of conventional compression techniques can be utilized to obtain this desired signal compression. In the present system, a log compressor is utilized to compress the amplitude of the signal over approximately 100dB of dynamic range. Log compression is especially suitable for detection applications because the system resolution is high for low level (distant target) signals and low for high level (close target) signals. The log compressor is implemented by means of an operational amplifier 24 with an appropriate feedback network 26. By way of example, the feedback network may be implemented merely by using the exponential relationship of a set of series-connected diodes. Using log compression, the resolution of the system becomes independent of the input signal level and the complexity of the FFT based tilted beam processor is substantially reduced. Without compression, the present A/D technology could not support the wide dynamic range required for the digital beam-former development.

The compressed signal output from the log compressor is sampled and converted to digital form by a standard A/D converter 28 such as the Teledyne Philbrick Model 4031 D/A converter. If an 8-bit A/D converter is utilized, a resolution to less than 0.5 dB can be obtained. If a 10-bit A/D converter is utilized a resolution to approximately 0.1 dB can be obtained. One bit is normally reserved to designate the sign of the log numbers.

The Sample Timing Control Logic 34 actually controls the energization of the A/D converters 28 and therefore the sampling times for these converters. This logic 34 control of the sampling times is accomplished in accordance with a preset schedule to effect the desired time or phase shifts required to tilt the beam along either array axis. The use of a programmable control logic 34 allows the system to generate multiple tilted beams.

The digital output signal from the A/D converters 28 is applied by a multiplexer 30 to a memory 32. (It should be noted that two parallel input lines from one block to another denote an electrical circuit bus.) The multiplexer 30 provides the switching necessary to select and store the sampled data in the memory 32. The multiplexer 30, which may be formed by a series of FET switches, is also controlled by the Sample Timing Control Logic 34 to effect the proper ordering of data in the memory 32. The memory 32, which may comprise a buffer random-access-memory (RAM), is used for intermediate storage and ordering of the data from all of the line arrays. The RAM also can be used to keep track of the outputs from each beam when a large number of beams are to be generated.

In some system configurations, it may be advantageous to weight the individual column and row line arrays with respect to each other in the log domain instead of effecting the weighting by setting the turns ratio of the primary windings in the transformers 18. Weighting in the log domain would require only a simple numerical addition. If log domain weighting is determined to be advantageous, then it could be accomplished merely by placing an adder (not shown) before the decompression operation discussed below and connecting the adder to the timing control logic 34 so that the proper weighting is added to the proper row or column line array.

The output signal from the RAM 32 is decompressed in a decompressor 36. The decompressor 36 converts the sampled data from the line arrays into a linear floating point format. The decompression necessary for the formation of a beam and the input data for the FFT may be accomplished by either a read-only memory (ROM) or a RAM programmed with the inverse log function and configured to have 8 to 10 bits of input address and a 12 or 13-bit output word. The output word could consist of an 8-bit magnitude, a 1-bit sign, and a 3 or 4-bit scale factor. The scale factor would be in the form $2^{(S)}$ where S is the binary representation of the shift in position of the 8-bit magnitude word. The dynamic range represented by $S=3$ would be 42 dB, while $S=4$ would have a dynamic range of approximately 90 dB. Thus, an 8-bit magnitude word with a 3-bit S word would cover the same dynamic range as a 15-bit binary word. The equivalent binary word for $S=4$ would be a 23-bit binary word. It should be noted that the line array-to-line array weighing could also be accomplished by properly scaling the magnitude term in the decompressor in lieu of setting the turns ratio in the transformer primaries.

The output from the decompressor 36 will be a relatively small word of fixed resolution. In order to properly scale the magnitude of this output a shifter 38 is utilized. This shifter 38 is, in turn, controlled by a shift control block 40. The shift control 40 receives magnitude data via bus 39 from the decompressor 36 and generates the proper scale. If RAM 44 in the accumulator 43 (to be discussed infra) has a limited word capacity, then the output from the compressor will also have to be scaled so that it is compatible with this accumulator RAM. This dual scaling can be accomplished via the shifter 38 by configuring the shift control 40 as an adder and merely adding the magnitude data from the decompressor to the proper scale factor obtained from the accumulator, RAM 44 via line 41. This sum is then utilized to control the shifter 38. The shifter 38 may take the form of the Signetics 8-bit model 8243 scaler.

This shifter signal is then accumulated with the appropriate weighted and time-shifted samples from other rows or columns and a sampled value for one tilted sensitivity pattern is generated. The accumulator 43 may comprise an adder 42 and a memory 44 such as a RAM or a latch single memory. The accumulation is accomplished by adding the shifted signal applied on bus 46 of the adder 42 with the number held in the RAM 44 (initially zero) and applied via the feedback bus 48. In this manner the time shifted samples from the row line arrays and column line arrays are accumulated and held in the RAM 44. The accumulator 43 is designed to calculate sample points for many different sensitivity patterns at the same time in this manner.

The output from the accumulator 43 is a wide dynamic range digital signal which will require some scaling before the signal is suitable for application to the FFT circuit. The output circuitry following the accumulator 43 provides an interactive interface to reduce the dynamic range of the data being processed by the FFT hardware. This output circuitry comprises a shifter 50. The shift control 52 may again comprise an adder. The FFT circuit or external control circuitry will provide one input via line 54 to the adder 52 requesting a given scale factor. The adder 52 adds this scale factor to a signal containing magnitude data from RAM 44 and applies the sum as a control signal to the shifter 50. This data shifting should shift the magnitude to a numerical order compatible with the FFT processor to thereby maintain the accuracy of the FFT output.

The output of line 56 comprises a series of bits representing the magnitude and a bit representing the magnitude sign for the sample value of a given tilted sensitivity pattern with the requested scaling. The generation of a series of these accumulated samples will permit the FFT to generate the spectrum for the particular beam of interest.

The sample timing control logic 34 controls the sampling rates of the A/D converters, as noted previously. This control logic 34 may comprise a clock counter 60 formed with TTL logic which progressively energizes a set of lines in a bus 61. If only a single beam is to be generated, then the lines in the bus 61 may be connected directly to the A/D converters 28 to make them operational at prescribed times. In this simple case the multiplexer 30 could be eliminated and the outputs lines from the A/D converters could be connected directly to the buffer RAM 32. No confusion would result since the counting circuit 60 would never energize two A/D converters simultaneously. However, when multiple beams are to be generated simultaneously, the control of the A/D converters 28 will become more complex as will the order of storage in the buffer RAM 32. Thus, the multiplexer 30 will be required to properly order the data in the buffer RAM 32 and a programmable decoder 62 will be required to control the energization of the A/D converters 28 and the opening of the FET gates in the multiplexer 30. This programmable decoder 62 may comprise a RAM set up to control the A/D converters 28 via bus 63 and the multiplexer 30 via bus 65 in accordance with the counter output on the bus 61.

As noted above, the weighting of the respect row and columns relative to each other may be accomplished by proper scaling in the decompressor RAM 36. If this method of weighting is used, then a decompressor weighting circuit 66 may be utilized to generate the proper weighting factor for each row and column. In order to determine which row or column is being sampled and thus what weighting factor to be applied to the compressor via bus 68, a bus 64 applies a series of counts from the counting circuit 60 to the weighting circuit 66. The weighting circuit 66 may comprise a RAM properly programmed with the desired row and column weights and controlled in accordance with which line in the bus 64 is high.

The sample timing and control logic 34 also functions to initialize the RAM 44 in the accumulator 43 to zero at the beginning of each beam. This initialization could be accomplished by directly connecting the output from one of the TTL circuits in the counting circuit 60 to the RAM 44 when only a single beam is being generated. If multiple simultaneous beams are to be generated, then an accumulator initialization circuit 70 may be provided to generate the multiple initializations via bus 74 to the RAM 44. This initialization circuit 70 may comprise a RAM properly programmed to generate initialization signals in accordance with the count on bus 72 from the counting circuit 60.

The bus 76 supplies external time shift information to the counting circuit 60 to control the counting operations to thereby damage the interval between the A/D converter sampling.

The present system can shift and digitally decompress an 8-bit magnitude word in less than 100 ns. The multiplication, add, and store time for the FFT hardware is approximately 200 ns. This FFT processing time will thus permit the generation of tilted beams for large arrays without reducing the data rate capability of the FFT.

The use of log amplitude compression in the present system is especially advantageous in the solution of complex homing and detection problems in an environment of wide dynamic range signal variations. The present system is uniquely suited for large multi-beam systems where a high data rate capability is required since almost no additional equipment is required for multiple beams than for a single beam.

While certain advantageous embodiments have been chosen to illustrate the invention, if will be understood by those skilled in the art that various changes and modifications can be made therein without departing from the scope of the invention as defined in the appended.

What is claimed is:

1. A beam-forming signal processor for preparing an input signal for application to a Fast Fourier Transform circuit comprising:

an array of signal sensors;

means for compressing a plurality of signals;

a plurality of means for coupling the signals from different subarrays of signal sensors in said array to said compression means and at least partially weighting said signals with respect to each other to form a desired beam shape;

means for sampling and digitizing the compressed signals from the different subarrays at present times in relation to each other to thereby impart a time shift to the compressed signals so that the direction of maximum sensitivity of the beam to be formed by processing these signals is tilted;

means for decompressing said time shifted signals;

means for accumulating a decompressed signal from each of said plurality of coupling means; and means for applying this accumulated signal representing one sample of a tilted sensitivity pattern to said Fast Fourier Transform circuit.

2. A beam-forming signal processor as defined in claim 1, wherein said signal sensors are pressure sensors.

3. A beam-forming signal processor as defined in claim 1, wherein said compressing means is an amplitude compressor.

4. A beam-forming signal processor as defined in claim 1, wherein said sampling and digitizing means include:

a plurality of analog-to-digital converters;

counting circuit means for controlling the sampling times of said plurality of digital converters in relation to each other;

storage means with an output connected to said decompressing means; and multiplexing means for applying the outputs from said plurality of analog-to-digital converters to said storage means under the control of said counting circuit.

5. A beam-forming signal processor as defined in claim 1, wherein said applying means comprises:

shifting means for properly scaling the output from said accumulating means for application to said Fast Fourier Transform circuit; and shifting control means for controlling said shifting means in accordance with a desired scale factor and in accordance with magnitude data from said accumulating means.

6. A beam-forming signal processor as defined in claim 1, wherein said accumulating means includes:

shifting means for properly scaling the output from said decompressing means;

a memory with its output connected to said applying means;

an adder for adding the output from said shifting means to the number stored in said memory and applying this sum as an input to said memory; and shifting control means for controlling said shifting means in accordance with control signals from said decompressing means and said memory.

7. A beam-forming signal processor as defined in claim 1, wherein each of said coupling means includes a transformer with a primary winding coupled to said compression means and with a plurality of secondary windings, one connected to each signal sensor in the respective subarray for that transformer.

8. A beam-forming signal processor as defined in claim 7, wherein the turns ratio of each transformer primary winding in relation to the other primary windings and the turns ratio of each secondary winding in relation to the other secondary windings in that subarray are set in order to properly weight the output signal from each coupling means in order to obtain a desired sensitivity pattern for the beam.

9. A beam-forming signal processor as defined in claim 1, wherein said subarrays of signal sensors are line arrays.

10. A beam-forming signal processor for use with a Fast Fourier Transform circuit in a sonar system comprising:

an array of pressure sensors forming a series of rows and columns;

a plurality of compression means;

a plurality of coupling means including a coupler for each row and for each column in said array of pressure sensors for coupling the analytical sum of the outputs from the sensors in that row of column to a different one of said plurality of compression means, said couplers at least partially weighting said signals with respect to each other to form a desired beam shape;

means for sampling and digitizing different ones of said compressed signals at predetermined times in relation to each other to thereby impart an appropriate time shift to the compressed signals in relation to each other so that the direction of maximum sensitivity of the beam to be formed by processing these signals is tilted, said sampling and digitizing means including an analog-to-digital converter for each one of said compression means;

means for decompressing said time shifted signals;

means for accumulating the decompressed signals originating from a plurality of said couplings means; and means for applying the signal from said accumulating means representing one sample of a tilted sensitivity pattern to said Fast Fourier Transform circuit.

11. A beam-forming signal processor as defined in claim 10, wherein said sampling and digitizing means include:

counting means for controlling the sampling times of said analog-to-digital converters in relation to each other;

a buffer memory with an output connected to said decompressing means; and a multiplexer for applying the outputs from said plurality of analog-to-digital converters applied to said buffer memory under the control of said counting means.

12. A beam-forming signal processor as defined in claim 10, wherein said applying means comprises:

a shifting means for properly scaling the output from said accumulator means for application to said Fast Fourier Transform circuit; and shifting control means for controlling said shifting means in accordance with a desired scale factor and in accordance with magnitude data from said accumulator means.

13. A beam-forming signal processor as defined in claim 10, wherein said accumulator means includes:

shifting means for properly scaling the output from said decompressing means;

a memory with its output connected to said applying means;

an adder for adding the output from said shifting means to the number stored in said memory and applying this sum as an input to said memory; and shifting control means for controlling said shifting means in accordance with a magnitude signal from said decompressing means and a scaling signal from said memory.

14. A beam-forming signal processor as defined in claim 10, wherein each of said couplers includes a transformer with a primary winding coupled to its respective compressor and with a plurality of secondary windings for each transformer, one connected to each signal sensor in the respective row or column for that transformer.

15. A beam-forming signal processor as defined in claim 11, wherein said decompression means appropriately weights the coupled outputs from the rows and columns with respect to each other under the control of said counting means to obtain proper beam shaping.

16. A beam-forming signal processor for preparing an input signal for application to a Fast Fourier Transform circuit comprising:

an array of signal sensors;

means for subdividing the signal sensors in said array into a plurality of subarrays;

compression means including one compressor for each subarray, said subdividing means analytically summing and weighting the signals from the signal sensors in each subarray and coupling these subarray signals each to a different one of said compressors;

means for sampling and digitizing the outputs from the different compressors at preset times in relation to each other to thereby impart a time shift to the compressed signals so that the direction of maximum sensitivity of the beam to be formed by processing these signals is tilted, means for decompressing said time shifted signals;

means for accumulating a decompressed signal from a plurality of said subarrays; and means for coupling this accumulated signal representing one sample of a tilted sensitivity pattern to said Fast Fourier Transform circuit.

17. A beam-forming signal processor as defined in claim 16, wherein said signal sensor array is an NXN array and said subdividing means subdivides said NXN array into a plurality of line subarrays.

18. A beam-forming signal processor as defined in claim 17, wherein said subdividing means subdivides said NXN array into 2N line arrays, one for each row and column in said NXN array.

19. A beam-forming signal processor as defined in claim 18, wherein said signal sensors are pressure sensors.

20. A beam-forming signal processor as defined in claim 18, wherein said subdividing means comprise a plurality of coupling transformers, one for each subarray, with the primary winding of each transformer coupled to a different compressor and with a plurality of secondary windings for each transformer, one connected to each signal sensor in the respective subarray.

21. A beam-forming signal processor as defined in claim 16, wherein said compressing means is a log compressor.

22. A beam forming signal processor as defined in claim 16, wherein said sampling and digitizing means include:

an analog-to-digital converter for each subarray, counting means for controlling the sampling times of said analog-to-digital converters in relation to each other;

storing means with an output connected to said decompressing means; and multiplexing means for selecting the order and the time that the outputs from said analog-to-digital converters are to be applied to said storage means.

23. A beam-forming signal processor as defined in claim 16, wherein said decompressing means appropriately weights the outputs from the coupled subarrays with respect to each other under the control of said counting means to obtain the proper beam shaping.

24. A beam-forming signal processor as defined in claim 16, wherein said accumulating means includes:

shifting means for properly scaling the output from said decompressing means;

a memory with its output connected to said coupling means, an adder for adding the output from said shifting means to the number stored in said memory and applying this sum as an input to said memory; and shifting control means for controlling said shifting means in accordance with control signals from said decompressing means and said memory.

* * * * *